Dec. 26, 1933.  D. W. LONGFELLOW  1,941,358
CONNECTING TRUSS FOR DRAIN PIPES
Filed Dec. 16, 1931
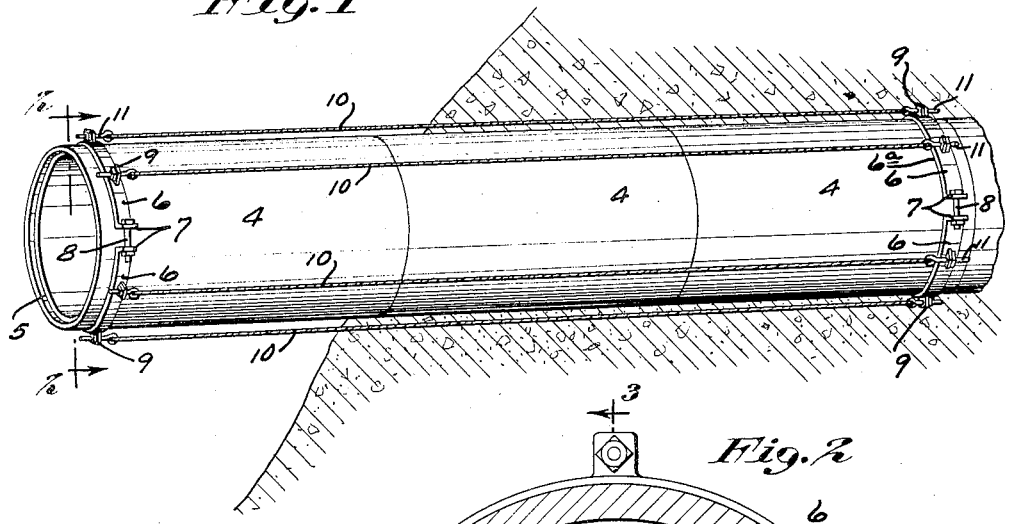
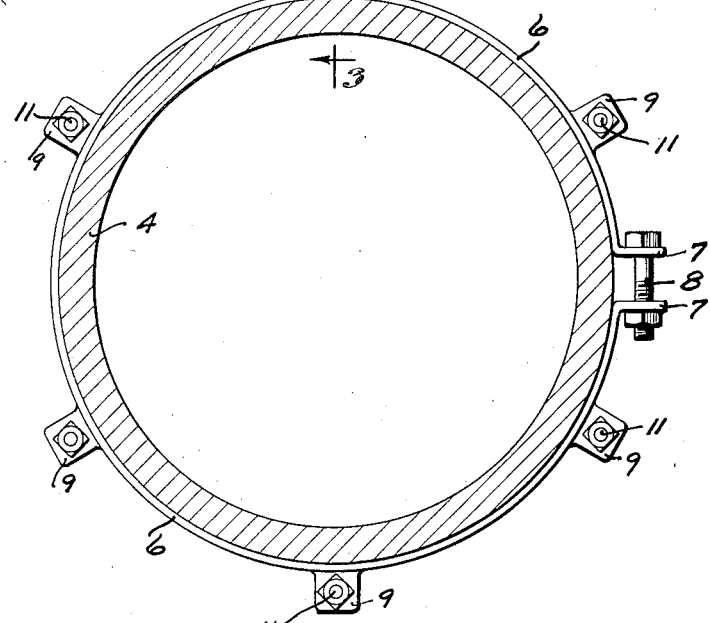
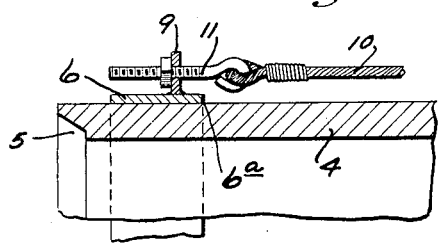
Inventor
DWIGHT W. LONGFELLOW
By his Attorneys Patented Dec. 26, 1933

1,941,358

UNITED STATES PATENT OFFICE 1,941,358

CONNECTING TRUSS FOR DRAIN PIPES

Dwight W. Longfellow, Minneapolis, Minn., assignor to The Elk River Concrete Products Co., Elk River, Minn., a corporation of Minnesota Application December 16, 1931
Serial No. 581,333

1 Claim. (Cl. 137—75)

My invention provides an extremely simple and highly efficient connecting truss for drain pipes and, generally stated, consists of the novel devices, combination of devices and arrangement of parts hereinafter described and defined in the claims. The term "drain pipe" is used in a liberal sense to include all water-conducting pipes such as those placed in the ground for draining land, pipes used as culverts, sewer pipes and the like. Particularly, the invention is designed to meet an urgent requirement in the proper installation and maintenance of large concrete drain pipes which frequently must be placed in newly excavated ground that is likely to settle and throw the connected pipe sections out of alignment and open the joints between the same, frequently entirely disconnecting the pipe sections. Frequently also it is desirable to project one or more sections of the drain pipe from a bank or the like beyond the portion supported by the bank. My improved connecting truss meets all of the above requirements and is capable of being applied to all or to a limited part of a long drain pipe. The truss comprises clamping rings adapted to embrace and to be securely anchored to pipe sections between which one or more pipe sections are interposed. These distant clamping rings are connected by longitudinally extended circumferentially spaced truss cables which, if short, might be wires or quite stiff rods, but which, if long, are made of wire cables.

Frequently, these cables, to meet the requirement of a particular application, should be fifty feet or more in length and it is not convenient to carry rods of that length, nor is it easy to cut such rods to the exact desired lengths. Wire cables or wire rope, on the contrary, may be conveniently carried in any length and quickly cut to proper length. Moreover, the cables, while they have the full tensile strength of rods, have a lateral flexibility that adapts them to yield without serious distortion in case they are pressed against rocks.

In the accompanying drawing, which illustrates the invention and wherein like characters indicate like parts throughout the several views, I have illustrated a connecting truss designed and applied in a manner in which I have hitherto put the same into use.

Referring to the drawing:

Fig. 1 is a perspective showing the connecting truss applied to a sectional drain pipe, one end of which is projected beyond a bank in which the main portion of the pipe is laid;

Fig. 2 is an enlarged section taken on the line 2—2 of Fig. 1; and

Fig. 3 is a section taken on the line 3—3 of Fig. 2.

The drain pipe sections 4 are shown of the cylindrical type provided at their ends with telescopic lap joints 5.

The clamping rings 6 are preferably of heavy band steel bent to fit the exterior of the pipe sections to which they are applied and provided with outturned end lugs 7, through which nut-equipped clamping bolts 8 are applied and which bolts, when tightened, very tightly clamp and anchor the rings to the pipe sections. These clamping rings are provided with outstanding circumferentially spaced lugs 9 which, for an important reason, are placed closer to the inner than to the outer edges of the rings. The wire cables 10 may vary in number, but as shown, there are six thereof spaced circumferentially around the drain pipe and extended longitudinally thereof with their ends firmly anchored to the lugs 9 of the two clamping rings. As shown, the ends of the cables are connected to the lugs 9 of both clamping rings by nut-equipped eye-bolts 11, which afford means for adjusting the tension of the cables. Adjustment at one end of each cable, would, however, be sufficient for most purposes. With this arrangement, it is possible to adjust the cables that are subject to greatest tension and, of course, the tension of all of the cables can be regulated as desired.

By placing the lugs 9 quite close to the inner or opposing edges of the clamping bands, the adjacent inner edge portions 6ª of the clamping rings will, under the tension from the cables, be bent slightly and depressed radially inward against the outer surfaces of the pipe sections, thereby causing said edges 6ª to bite into or against the concrete surfaces of the pipe sections; and this very greatly adds to the firm anchoring of the rings against slipping movement under the tension from the cables.

In actual practice, the efficiency and desirability of the device described has been thoroughly demonstrated.

What I claim is:

The combination with a plurality of axially abutting drain pipe sections, of metallic clamping rings rigidly applied to said pipe sections and having circumferentially spaced outstanding lugs, and circumferentially spaced longitudinally extended tension members connecting the lugs of said clamping rings and equipped with means for independently tightening the same, said lugs being located materially nearer to the inner than to the outer edges of said rings, whereby the inner edge portions of said rings will be bent and forced against the pipe sections with increased biting actions preventing slippage of the rings under the pull of said tension members.

DWIGHT W. LONGFELLOW.